United States Patent Office 3,468,322
Patented Sept. 23, 1969

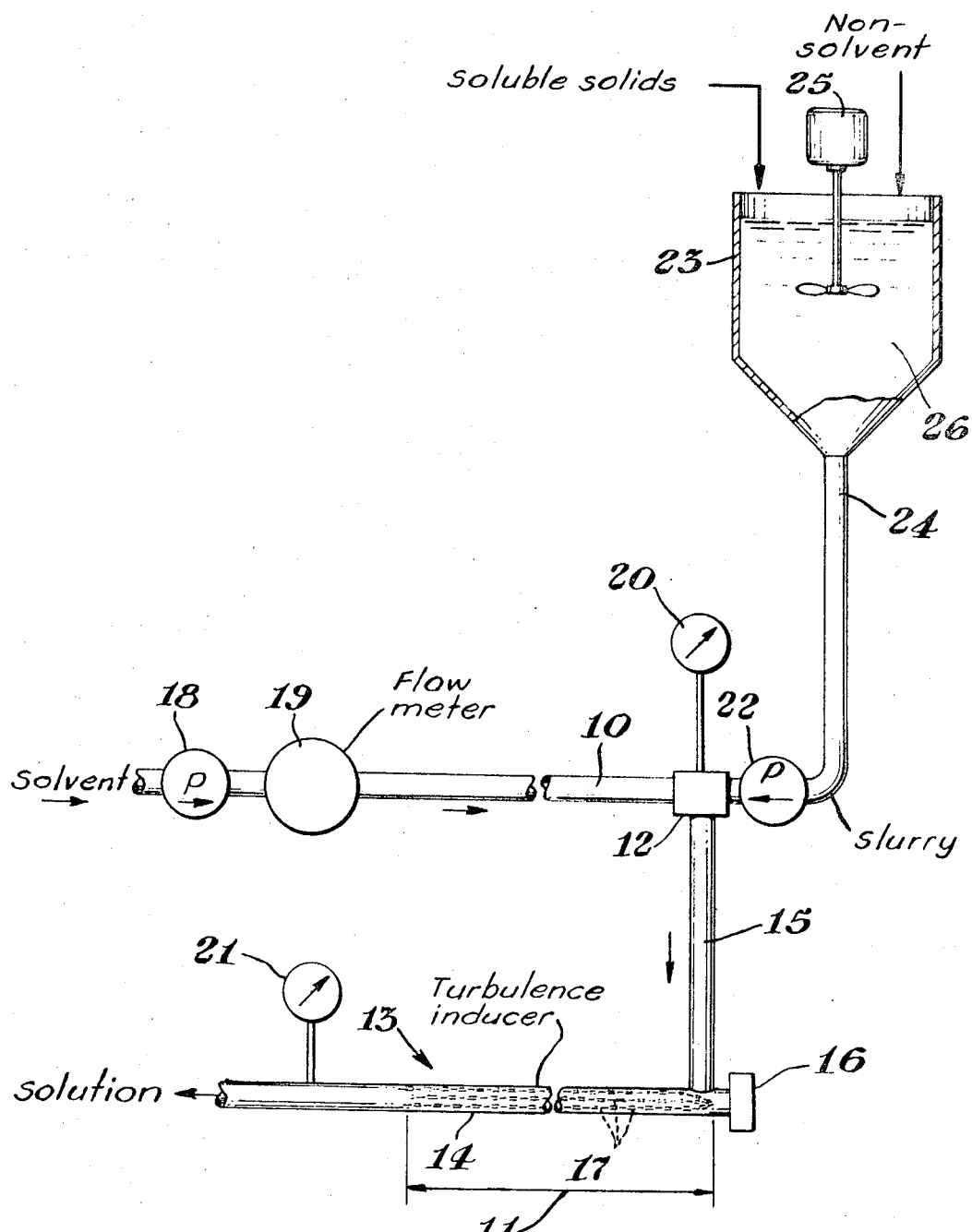

3,468,322
DISSOLVING SOLIDS IN SOLVENTS
Melvin F. Katzer, Danville, Calif., assignor to The Dow Chemical Company, Midland, Mich., a corporation of Delaware
Filed July 24, 1967, Ser. No. 655,491
Int. Cl. E03b 1/00; B67d 5/08; F15d 1/02
U.S. Cl. 137—1                                         5 Claims

ABSTRACT OF THE DISCLOSURE

A method is provided for continuously metering and rapidly dissolving a soluble solid in a solvent. The solid material to be dissolved is mixed with a liquid, which is a non-solvent for the solid, to form a liquid slurry. The slurry then is metered into a flowing stream of the solvent, usually on a proportionate basis. The solvent slurry mixture is then forced through a turbulence inducer comprising a conduit in which there is at least one extended length of chain. Preferably, the number of chain lengths is sufficient to loosely fill the conduit. Good dispersion and solution rates are achieved with chains at least about 6 inches long, but longer chains can be used with advantage.

---

The present invention concerns an improved method and apparatus for metering finely divided, soluble solids into a solvent and achieving uniform dispersion and rapid solution of the solids in the solvent.

Many techniques have been evolved for mixing and dispersing soluble solids in solvents. Conventionally the solids are dispersed directly into the solvent and subjected to mechanically induced agitation. It is also known that good mixing can be achieved in turbulent streams of solvent.

Problems are often encountered in the use of conventional mixing techniques to dissolve solids, especially water-soluble polymers in water. In order to avoid agglomeration of the solids in the solvent and resulting slow solution rates for the agglomerates, severe mechanical agitation may be used. However, such agitation seldom occurs throughout the entire volume of the mixing vessel with the use of conventional agitation means. For instance, propellers and turbine blades always leave a considerable volume of liquid outside of the high shear zone and thus the mixing is not uniform. What is more, high shear agitation has the disadvantage that when applied to polymer systems the molecules may be broken down and the polymer lose some of its desired properties.

In view of the above desiderata, it is an object of the instant invention to provide an improved method for uniformly dispersing soluble solids in solvents. Of particular value is the application of the instant invention to the dispersion and rapid solution of water-soluble polymers in water without the localized application of high shearing forces. A further object and benefit of the instant invention is a convenient metering technique for incorporating soluble materials in a flowing stream of solvent. Uniform solutions can be obtained without the requirement of intermediate mixing and holding tanks.

In accordance with the instant invention, a method is provided for dissolving finely divided solids in a solvent which comprises slurrying the solids in a non-solvent therefor. The resulting slurry is metered, optionally at a proportionate rate, into a flowing stream of a solvent for the solids. The resulting mixture is then flowed through a turbulence inducer comprising a conduit containing at least one extended length of chain. Preferably the conduit is loosely filled with a series of extended lengths of chain.

The invention will be better understood by reference to the accompanying schematic drawing illustrating the flow diagram of the process and apparatus for implementing the same.

In the drawing, a mixing T 12 is supplied with solvent by means of a centrifugal pump 18 through line 10. The rate of flow is measured with a flow meter 19. A slurry 26 of soluble solids is prepared in a non-solvent within a mixing tank 23 by means of agitation supplied by a propeller stirrer 25. From the mixing tank 23 the slurry 26 is pumped by means of a piston pump 22 through line 24 into the mixing T 12. The mixture resulting from the confluence of solvent and solids slurry 26 exits from the mixing T 12 through line 15 into a turbulence inducer 13 comprising conduit 14 containing several lengths of chain 17. These lengths of chain 17 are fastened at one end to a header plug 16 in the conduit 14 upstream from the inlet for the mixture of solvent and slurry. Together they form a chain bed 11. On the discharge end of the conduit 14 and on the mixing T 12 are pressure gauges 21 and 20, respectively.

In a particular mode of operation a quantity of finely divided soluble solids, such as a water-soluble polymer, is agitated in the presence of a non-solvent in the mixing tank 23. A suitable non-solvent for the water-soluble polymer is a liquid hydrocarbon. The resulting slurry of solids is pumped into a flowing stream of water maintained by means of the centrifugal pump 18 at the mixing T 12. The confluent aqueous mixture of solvent and slurry then flows through connecting line 15 into the turbulence inducer 13.

Pumps 18 and 22 may be operated at relative rates to give a desired proportioning of solids to water. The slurry pumping rate will, of course, be dependent upon the concentration of the solids in the slurry. This may be any amount which can be conveniently fluidized in the non-solvent. Normally the solids will not exceed about 40 percent by weight of the liquid slurry.

The flow rate through the turbulence inducer 13 is maintained at a level sufficient to yield effective dispersion and rapid solution of the polymer. Effective pressure drops, between the upstream and downstream gauges, may vary according to the design of the turbulence inducer. With larger conduits 14, higher flow rates will be required to give a desired pressure drop. The number of chain lengths 17 within the turbulence inducer and the design or size of the chain links will also affect the pressure drop. Increasing the density of chain packing, i.e. increasing the number of chain lengths and chain links within each length, has a positive influence on the pressure drop per unit length of turbulence inducer 13. The total pressure drop may also be varied by increasing the length of the chain bed 11 within the turbulence inducer 13.

When dispersing and dissolving water-soluble polymers in accordance with the invention, pressure drops across the turbulence inducer 13 of about 50 to 200 pounds per square inch will give good dispersion and solution rates. Turbulence inducers with chain beds at least about 6 inches long are preferred. For practical reasons, turbulence inducers usually have chain beds from about 1 to about 4 feet. Longer beds can be used if desired.

Materials of construction will vary according to the requirements of materials to be handled. Stainless steels and other corrosion resisting materials are best when water is the solvent.

By way of illustration, efficient turbulence inducers have been prepared from pipe sections two feet long having inside diameters of 0.5, 0.75 and 1 inch, respectively. Twist link chains having approximately 66 links per foot were suspended in each of the two smaller conduits from a plug on the upstream end of the conduits. Eight lengths of the chain loosely filled the 0.5 inch pipe and 12 lengths were used for the 0.75 inch conduit. Six lengths of a jack chain having 20 links per foot were used in the 1 inch pipe. In each chain bed, the chains were sufficiently mobile to allow the continuous unloading of any solids that might be trapped by the chains. The pressure drop achieved in each of the described turbulence inducers was measured for a series of flow rates. The results are reported in the following table.

TABLE

| Pipe (I.D.) (in.) | Flow rate (gals./min.) | Turbulence inducer pressure drop (p.s.i.) |
|---|---|---|
| 0.5 | 1.68 | 50 |
|  | 3.78 | 50 |
|  | 5.88 | 50 |
|  | 13.44 | 150 |
| 0.75 | 10.08 | 50 |
|  | 14.28 | 100 |
| 1 | 21.8 | 100 |
|  | 25.6 | 150 |

In a similar manner, larger conduits, which need not necessarily be pipe sections but may have any cross section of convenience, can be packed with one or more chain lengths, preferably in an amount sufficient to loosely fill the conduit. Chains fastened at only one end give the best operation. Any shape chain link may be used. These include, for example, the straight link chains, twist link chains, single and double loop chains, jack chains, and register chains. Effectively, any flexible series of interlocking loops or links can be utilized for the packing of the turbulence inducer.

The method and apparatus is applicable to the mixing and metering of any soluble solid in a liquid solvent. By far the most common systems are water-soluble solids which can be dispersed in an organic non-solvent for the solids, such as for example, a liquid hydrocarbon, alcohol, glycol, ether, polyglycol or polyglycol ether to form a solids-liquid slurry. The non-solvent of choice may either be miscible or immiscible with the solvent. In either case, the solvent-slurry mixture formed in the mixing T is subjected to uniform mixing along the tortuous flow path defined by the extended chain lengths within the turbulence inducer. On discharge from the turbulence inducer, the solvent-slurry system has undergone mixing adequate to produce a good dispersion of the solids without the use of severe or shearing agitation.

What is claimed is:
1. A method for dissolving a soluble solid in a solvent which comprises forming a liquid slurry of the solid in a non-solvent, metering the slurry into a flowing stream of the solvent and passing the resulting solvent-slurry mixture through a turbulence inducer comprising a conduit containing at least one extended chain length.

2. A method as in claim 1 wherein the chain lengths loosely fill the conduit in which they are contained and collectively they form a chain bed at least about 6 inches long.

3. A method as in claim 1 wherein the pressure drop through the conduit containing the extended chain length is at least 50 pounds per square inch.

4. A method as in claim 1 wherein water is the solvent; the soluble solids are a finely divided water-soluble polymer and the non-solvent is an organic liquid in which the solids are insoluble.

5. A method as in claim 4 wherein the pressure drop through the conduit containing the extended chain length is within the range from about 50 to 200 pounds per square inch whereby excessive degradation of the polymer is avoided.

References Cited
UNITED STATES PATENTS

| 2,509,509 | 5/1950 | Leaders et al. | 260—705 X |
| 2,645,463 | 7/1953 | Stearns | 259—4 |
| 2,949,934 | 8/1960 | Schrenk | 138—42 X |
| 3,202,690 | 8/1965 | Previc | 260—704 X |

FOREIGN PATENTS

| 216,577 | 9/1956 | Australia. |
| 886,419 | 8/1953 | Germany. |

WILLIAM F. O'DEA, Primary Examiner

D. H. LAMBERT, Assistant Examiner

U.S. Cl. X.R.

137—3, 604; 138—42; 259—4; 260—705